No. 802,867. PATENTED OCT. 24, 1905.
J. L. LARSON.
ADJUSTABLE MIRROR SUPPORT.
APPLICATION FILED JAN. 23, 1905.
2 SHEETS—SHEET 1.
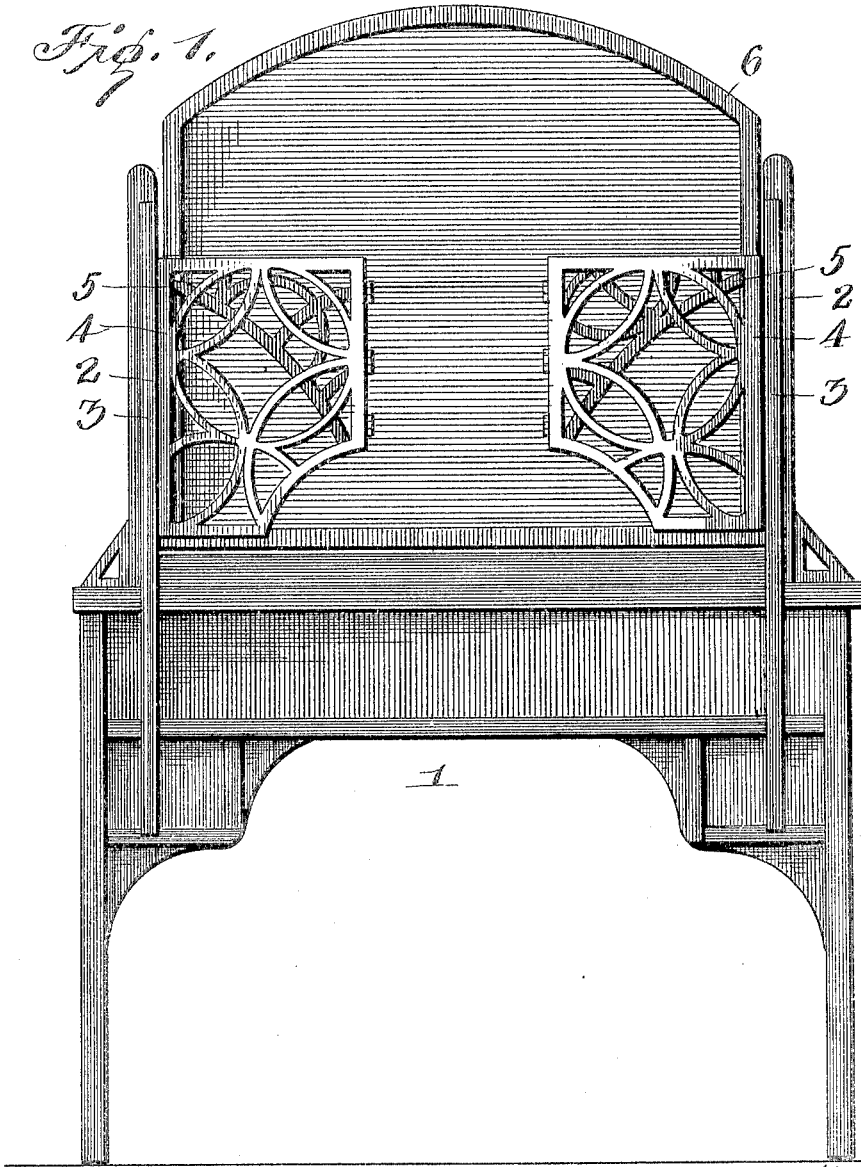
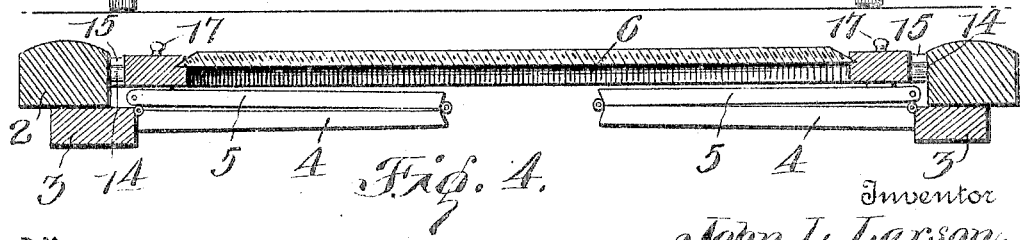
Witnesses
Jas. A. Roehl
C. H. Gresbauer.
Inventor
John L. Larson,
by H. B. Willson
Attorney

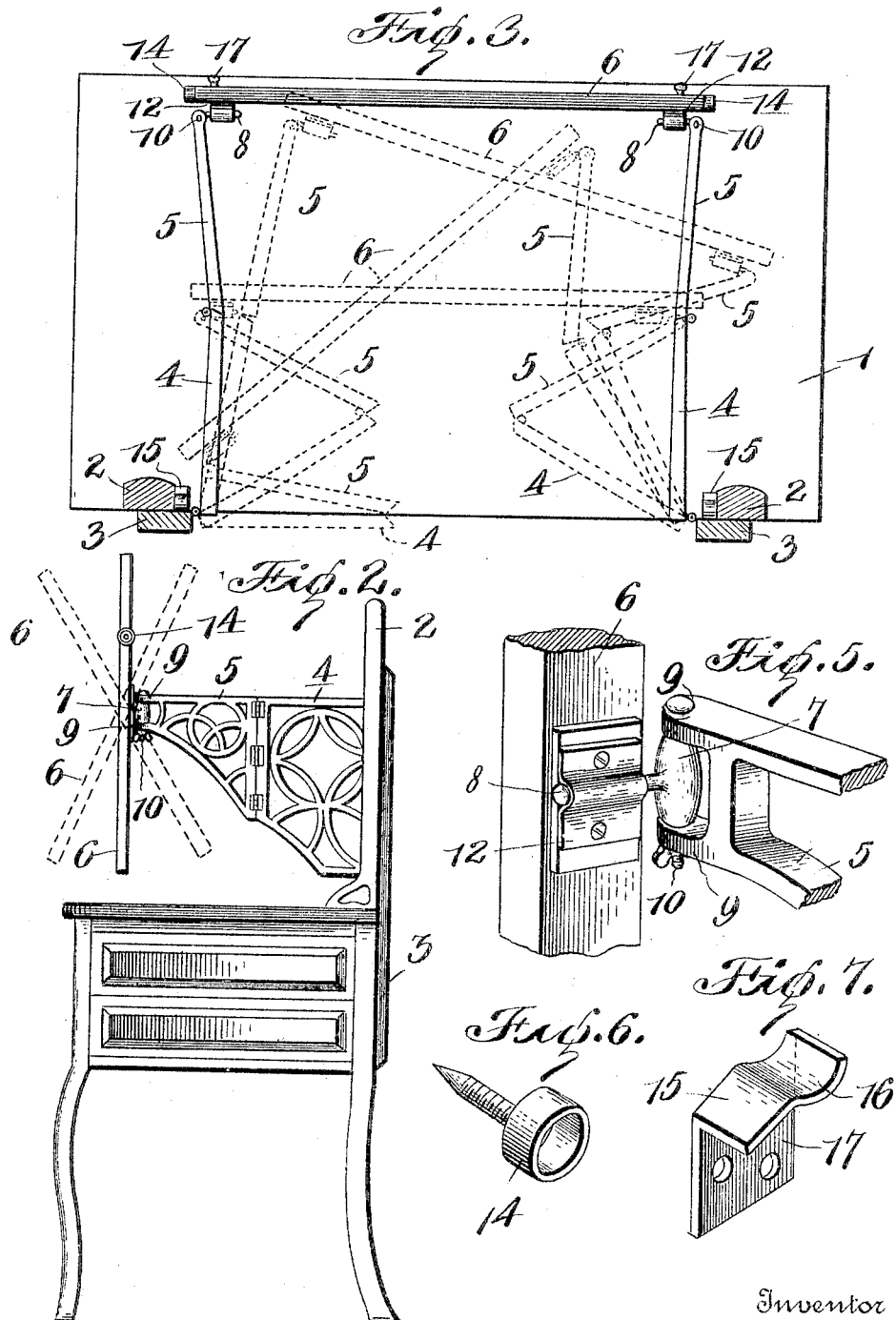

UNITED STATES PATENT OFFICE.

JOHN LAWRENCE LARSON, OF GRAND RAPIDS, MICHIGAN.

ADJUSTABLE MIRROR-SUPPORT.

No. 802,867. Specification of Letters Patent. Patented Oct. 24, 1905.

Application filed January 23, 1905. Serial No. 242,334.

*To all whom it may concern:*

Be it known that I, JOHN LAWRENCE LARSON, a citizen of the United States, residing at Grand Rapids, in the county of Kent and State of Michigan, have invented certain new and useful Improvements in Adjustable Mirror-Supports; and I do declare the following to be a full, clear, and exact description of the invention, such as will enable others skilled in the art to which it appertains to make and use the same.

This invention relates to improvements in adjustable supports for mirrors.

The object of the invention is to provide a support of this character for attaching a mirror to dressing-tables, bureaus, and the like whereby said glass may be moved out over the table and adjusted to various angles or tilted up or down over the same.

Another object is to construct the supporting devices for the mirror whereby the hinged supporting-brackets of the same will be prevented from being drawn entirely straight, thereby enabling the brackets to be easily folded when the mirror is pushed back.

A further object is to provide means whereby the weight of the mirror will be taken off the supporting-brackets when the mirror is in its folded or normal position.

With these and other objects in view the invention consists of certain novel features of construction, combination, and arrangement of parts, as will be hereinafter described and claimed.

In the accompanying drawings, Figure 1 is a rear view of a dressing-table, showing the application of the invention, the mirror being shown as pushed back or in its normal position. Fig. 2 is an end elevation showing the mirror in an extended position and showing in dotted lines the manner of tilting the same upwardly or downwardly. Fig. 3 is a top plan view showing the mirror extended and in dotted lines showing the different angles to which the same may be turned. Fig. 4 is a horizontal view taken immediately above the mirror-supporting brackets, showing the same folded and the mirror pushed back in a normal position. Fig. 5 is a detail perspective view of the hinge which connects the mirror and bracket, and Figs. 6 and 7 are detail views showing the roller and bracket for supporting the mirror when pushed back in normal position.

Referring more particularly to the drawings, 1 denotes a dressing-table or bureau which is provided at its rear side with upwardly-projecting standards 2, to which are secured brace-bars 3. To said brace-bars and standards are hingedly connected the inner ends of a pair of supporting-brackets 4, to the outer ends of which are hingedly connected a second pair of supporting-brackets 5. Said brackets are adapted to be folded rearwardly upon each other, as shown in Fig. 4 of the drawings. To the outer ends of the brackets 5 is pivotally and hingedly connected a mirror-frame 6. The hinged connection of the mirror to the frame 5 preferably consists of a tubular sleeve 7, having formed thereon a laterally-projecting journal or spindle 8. The sleeve 7 is adapted to be arranged between the pair of apertured lugs 9, formed on the end of the brackets 5, and through said apertured lugs and the sleeve 7 is inserted a hinge pin or pintle 10. The spindle 8 is adapted to be engaged with a bearing-plate 12, secured to the rear side of the mirror-frame, thereby pivoting said frame to the brackets 5 to permit the same to be tilted upwardly and downwardly, as shown in dotted lines in Fig. 2 of the drawings, and at the same time hingedly connect the frame to the brackets 5 to permit the same to be adjusted at various angles over the table or bureau top, as shown in dotted lines in Fig. 2, thus permitting the mirror to be adjusted to various positions and at different angles, thereby greatly facilitating the use of the same.

The meeting edges of the brackets 4 and 5, where the same are hinged together, are formed at a slightly obtuse angle with respect to the brackets, thereby preventing the same from being entirely straightened out when the brackets are unfolded and the mirror moved outwardly to its full extent, thus permitting the brackets to readily fold inwardly when the mirror-frame is pushed back, this construction avoiding the necessity of reaching behind the mirror to break the joint of the brackets when it is desired to fold the same.

On the edge of the mirror-frame is pivotally mounted a roller 14, which when the mirror is moved to its normal or retracted position is adapted to engage and run up an inclined plate 15 and to seat itself upon a curved plate 16, formed on a bracket 17, secured to the adjacent edge of the standards 2 of the bureau or dressing-table. The arrangement of said bracket-plates is such as to slightly lift and support the mirror-frame, thereby relieving the brackets 4 and 5 of the weight of the same when in its normal position, the curvature of the plate 16 being such that the roller 14 may be readily disengaged therefrom when the mirror is pulled outwardly. On the outer face of the mirror-frame are arranged knobs 17, by which the frame is moved back and forth over the top of the bureau or dressing-table.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A mirror-support for bureaus and the like, consisting of pairs of brackets hinged together and hingedly connecting said mirror to the bureau whereby the former may be moved out over the top of the bureau, means whereby said mirror may be tilted in its extended position, and means whereby the weight of the mirror is taken off said brackets when the same is in folded position, substantially as described.

2. A mirror-frame support for bureaus and the like, consisting of pairs of brackets hingedly connected together and hingedly connecting said mirror to the bureau to permit the former to be moved back and forth and at various angles over the top of said bureau, a roller secured to each side edge of the mirror-frame, and bracket-plates secured to the adjacent edges of the mirror-supporting standards to receive said rollers when the mirror-frame is pushed back, thereby taking the weight of the mirror-frame off from the hinged brackets, substantially as described.

In testimony whereof I have hereunto set my hand in presence of two subscribing witnesses.

JOHN LAWRENCE LARSON.

Witnesses:
BENN M. CORWIN,
MARGARET E. BATSON.